United States Patent [19]  [11]  4,177,142
Halbfoster  [45]  Dec. 4, 1979

[54] MIXTURE OF OPPOSITELY CHARGED FILTER AID MATERIAL

[75] Inventor: Christopher J. Halbfoster, Greenbrook, N.J.

[73] Assignee: Ecodyne Corporation, Chicago, Ill.

[21] Appl. No.: 836,967

[22] Filed: Sep. 27, 1977

Related U.S. Application Data

[63] Continuation-in-part of Ser. No. 457,821, Apr. 4, 1974, abandoned.

[51] Int. Cl.$^2$ .............................................. B01D 37/02
[52] U.S. Cl. ..................................... 210/75; 210/504; 210/505; 210/508
[58] Field of Search ............... 210/24 R, 36, 502, 503, 210/504, 505, 510, 367, 38 C, 75, 509, 508; 252/426; 428/403, 404, 407; 427/212, 221

[56]  References Cited

U.S. PATENT DOCUMENTS

| 3,242,073 | 3/1966 | Guebert | 210/501 |
| 3,250,702 | 5/1966 | Levendusky | 210/24 |
| 3,352,424 | 11/1967 | Guebert | 210/36 |
| 3,600,329 | 8/1971 | Enriquez | 252/426 |

OTHER PUBLICATIONS

Balthazar, J., "Belgian Experience with Powdered Resin Filter," Trib Cebedeaux, Oct. 1969.
Balthazar, J., "Methodical Investigations of Continuous Condensate Purification with Powderesin Alluvial Filters," VGB Feed Water Convention, 1971.
Balthazar, J. "Ion Purification of Condensates by Powdered Resin Filters," Laborelec, Report NI1455.
Problems of Chemistry and Physics of Power Plants. The Performance and Possibilities of Application of Filters Utilizing Powdered Ion Exchange Resins, Aug. 27, 1968.
Betz Handbook of Industrial Water Conditioning, 7th Edition, 1976, pp. 53–56.

Primary Examiner—Charles N. Hart
Assistant Examiner—Ernest G. Therkorn
Attorney, Agent, or Firm—David A. Anderson; Gary M. Ropski

[57]  ABSTRACT

Impurities are removed from a liquid by passing the liquid through an improved filter bed. The filter bed comprises a mixture of oppositely charged particles of filter aid material, the particles normally having a surface charge in aqueous solution. A portion of these particles are treated with a chemical compound to produce a surface charge that is opposite from the normal surface charge. These oppositely charged particles clump in aqueous suspension, and produce a filter bed which is capable of removing suspended particles with very high efficiency, while maintaining a relatively low pressure drop across the filter bed.

24 Claims, 3 Drawing Figures

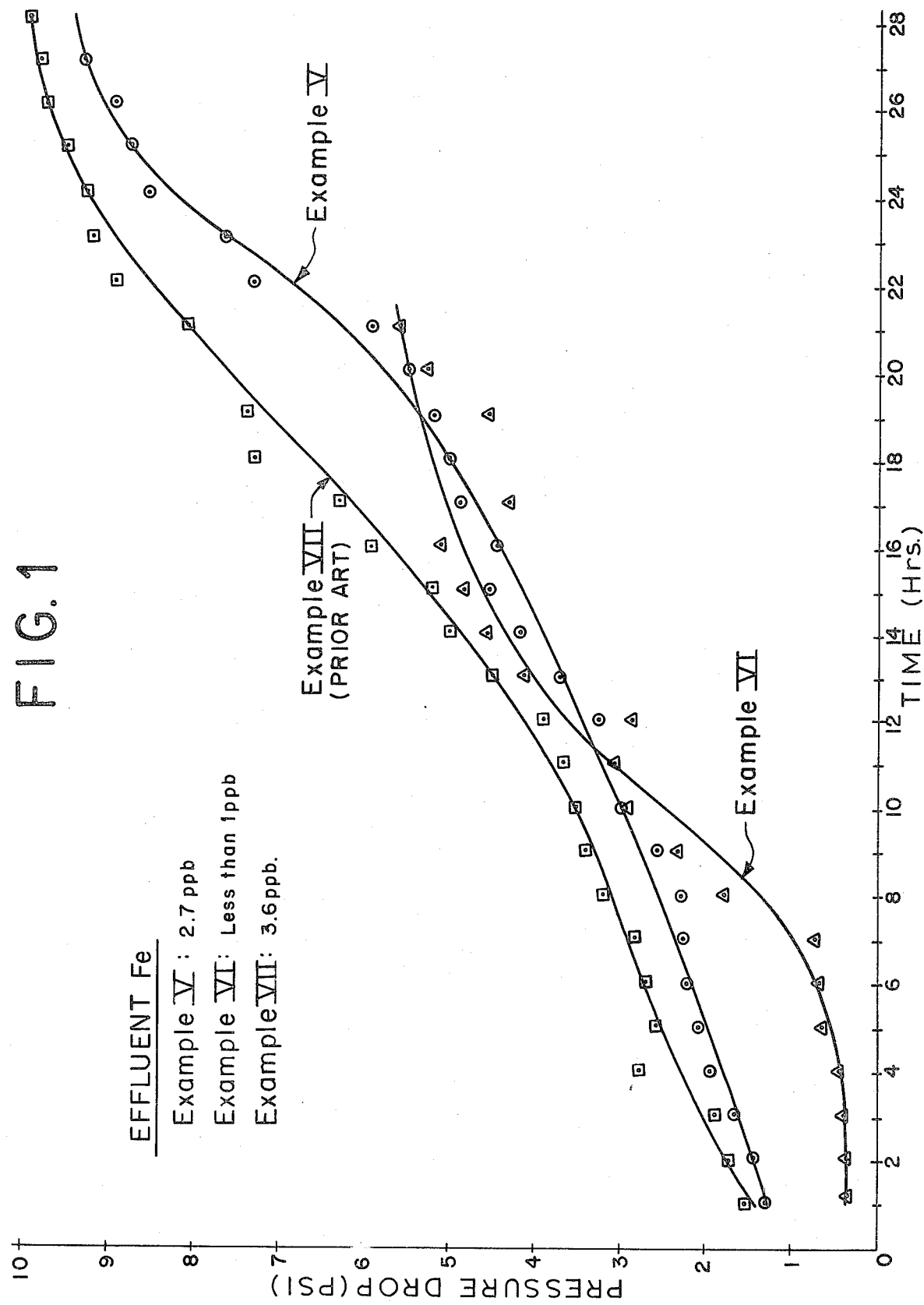

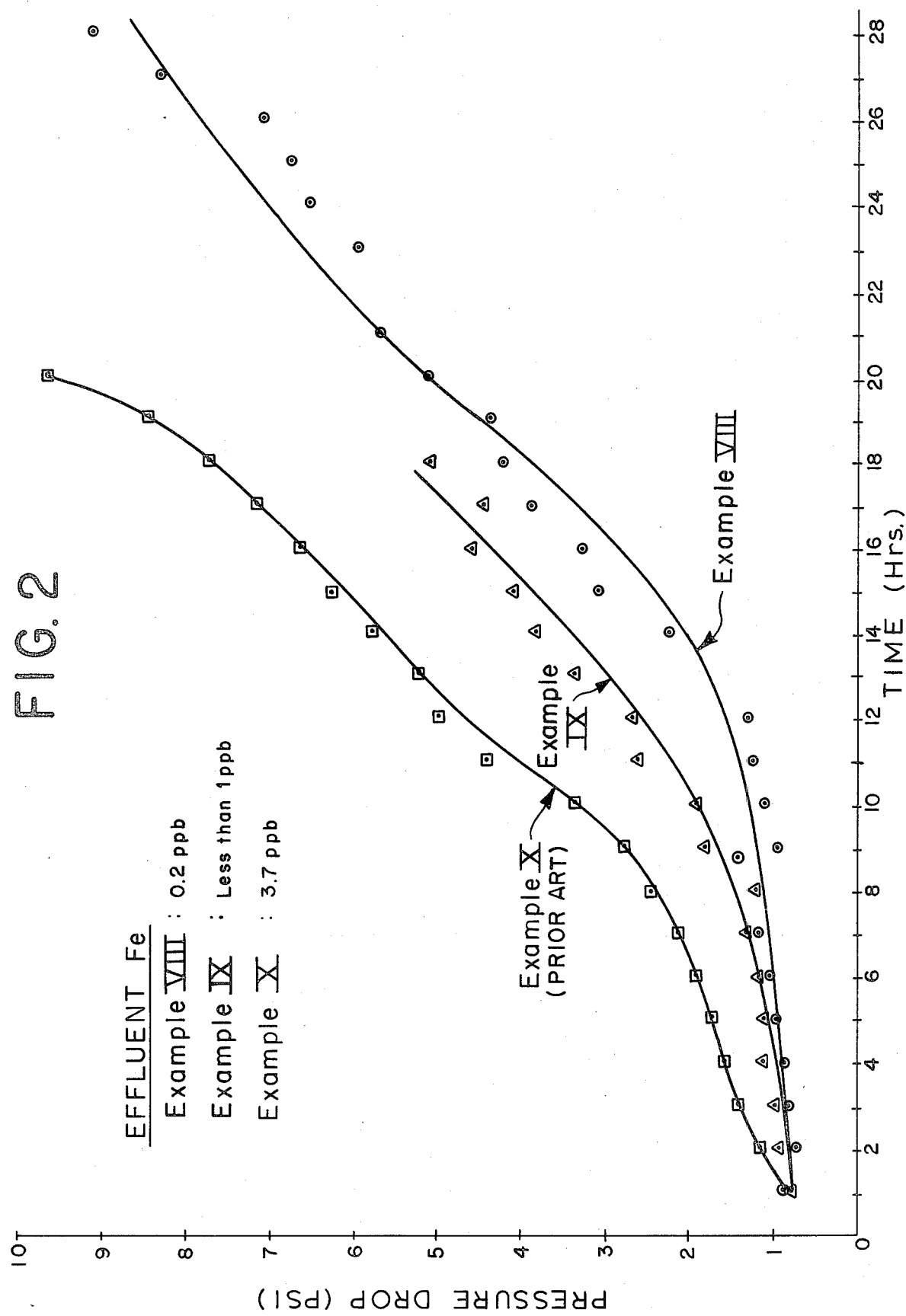

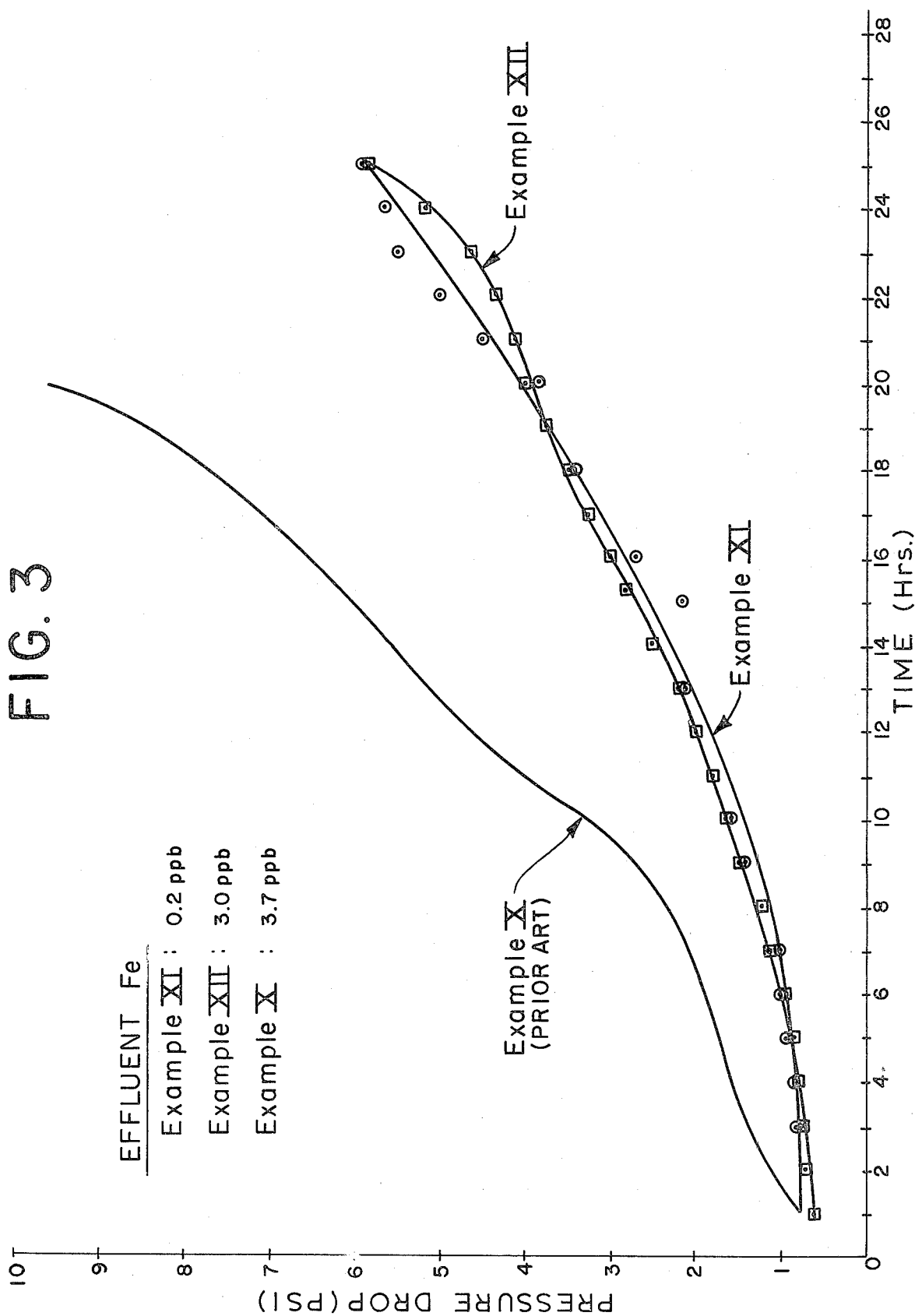

MIXTURE OF OPPOSITELY CHARGED FILTER AID MATERIAL

This application is a continuation-in-part of my copending application, Ser. No. 457,821, filed Apr. 4, 1974, now abandoned.

The present invention relates to an improved method for removing impurities from a liquid, and to an improved filter bed.

It has been found that the removal of suspended impurities from a liquid is enhanced by passing the liquid through a filter that has been precoated with a layer of ion exchange resin particles in the size range of 60 to 400 mesh. Such a method is described and claimed in U.S. Pat. No. 3,250,703, which is assigned to the assignee of this application. It has further been found that the pressure drop across the bed of finely divided resin particles may be reduced, while filtration efficiency is simultaneously increased, by employing a bed comprising a mixture of cation and anion exchange resin particles, this mixture comprising in the range of about 5 to 95% cation exchange resin particles based on the weight of the mixture. The reduced pressure drop results from "clumping," which occurs when the particles are combined in aqueous suspension. This method is described and claimed in U.S. Pat. No. 3,250,702, which is assigned to the assignee of this application.

As used herein, the term "bed" refers to a layer, such as a precoat layer, which has been deposited on a filter screen, a wound, annular filter cartridge, a film, a deep or shallow bed, or the like. Such a bed may advantageously be deposited on a tubular filter cartridge such as those described in U.S. Pat. No. 3,279,608, which is assigned to the assignee of this application.

Although ion exchange resin mixtures form a highly efficient filtration system, the ion exchange resins are expensive, and, in some instances, ion exchange capacity is unnecessary. That is, it is sometimes desired to employ a filter having a reduced pressure drop and increased efficiency solely for the removal of finely divided suspended particles ("crud") from liquids.

There are also many instances where it is desirable to employ a non-ion-exchange resin overlay over the above-described mixed ion exchange resins. Such an overlay is particularly desirable when the liquid being filtered contains suspended particles which interfere with the ion exchange resin. For example, it has been found that iron contaminants, particularly red iron oxide ($Fe_2O_3$), have a tendency to cause cracking of ion exchange resin precoats, with a resultant breakdown in both filtration and ion exchange efficiency. If an overlay can be employed over the ion exchange resin in order to remove these contaminants from the liquid, the run length for the ion exchange resin can be greatly increased. Another advantage to the use of an overlay on precoated filters is that backwashing of the filter to remove the precoat is generally easier than it is when the overlay material is used alone.

Generally, the present invention relates to a method for removing impurities from a liquid by passing the liquid through a filter bed which comprises a mixture of oppositely charged particles of filter aid material. The filter aid particles that are employed normally have a surface charge in aqueous suspension, and a portion of the particles is treated with a chemical compound to produce a surface charge which is opposite to the normal surface charge. A mixture of oppositely charged particles (normal and reversed) is therefore produced, and the "clumping" phenomenon is achieved without the need to employ cation and anion exchange resin particles.

The invention also provides an improved filter bed which comprises a mixture of oppositely charged particles of filter aid material. Again, these particles normally have a surface charge in aqueous suspension, and a portion of the particles is treated with a chemical compound to produce a surface charge opposite to the normal surface charge.

More specifically, it has been found that the phenomenon of "clumping" described in U.S. Pat. No. 3,250,702, together with the advantageous reduced pressure drop and increased filtration efficiency of this phenomenon, can be achieved by combining particles of filter aid material which have been treated in a manner to produce an opposite charge on a portion of such particles. This opposite charge is produced by treating a portion of the particles with a chemical compound that produces a surface charge opposite to the normal surface charge. In order to produce the clumping phenomenon, it is necessary that a portion of the particles retain a charge which is the same as the normal surface charge. These particles may be untreated, or, desirably, may also be treated with chemical compounds in order to enhance the normal surface charge thereon.

It is well known in the art that many types of filter aid material normally carry a surface charge. By the term "filter aid material," applicant refers to those materials which are conventionally deposited on a filter screen or the like in order to aid in the filtration which is produced by the filter. Most of such materials are characterized by an electronegatively charged surface. Such materials are well known in the art, and include diatomaceous earth, cellulose fibers, charcoal, expanded perlite, asbestos fibers, etc. Cation exchange resin particles also have a negative surface charge, and may be employed as filter aid particles in accordance with the present invention. Particularly preferred filter aid particles for use in accordance with the invention are cellulose fibers, which are available commercially under the trade name Solka-Floc.

Although most filter aid materials normally have a negative surface charge, some have a positive charge. Such particles include, for example, anion exchange resin particles. Such filter aid materials may also be employed in accordance with the present invention, wherein they are treated with a chemical compound in order to produce a positive surface charge on some of the particles, so that the clumping phenomenon is again achieved when oppositely charged particles are mixed.

A wide variety of chemical compounds may be employed in accordance with the present invention in order to produce a reverse surface charge on a portion of the particles. Such compounds must be miscible with water, and the compounds must have a plurality of charge sites. A plurality of charge sites is required in order that the compound can form a bond with the filter aid material, and will have charge sites remaining to produce a surface charge that is the reverse of the normal surface charge.

When the filter aid particles normally have a negative surface charge, a cationic electrolyte-type compound is employed, preferably a cationic organic polyelectrolyte. These cationic compounds form an electrical bond with the surface of the negatively charged filter aid material, producing a positive charge on the surface thereof. Suitable non-polymeric cationic-type compounds include 1-carboxymethyl pyridinium chloride and cetyl pyridinium chloride. Suitable polymeric cationic polyelectrolytes include linear polyelectrolytes characterized by little, if any, crosslinking. Many such polyelectrolytes are well known in the art, and include polyalkylene imines, polyalkylene polyamines, polyvinyl benzyl quaternary ammonium salts, polyvinyl benzyl tertiary amines, vinylbenzyl sufonium polymers, etc. Specific polymeric compounds that could be employed include, for example, poly (1-butyl-4-vinyl pyridinium bromide), and poly (1,2-dimethyl-5-vinyl pyridinium methyl sulfate). A particularly suitable cationic polyamine is one characterized by the repeating structure:

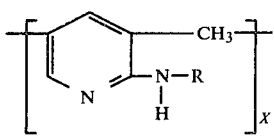

However, it should be understood that the above-mentioned specific compounds are not the only ones that can be utilized, as many suitable compounds are well known in the art.

In the instance when the filter aid employed has an electropositively charged surface in aqueous solution, an anionic-type compound is employed in order to produce a reverse surface charge. Again, the preferred compound is an anionic polyelectrolyte. Suitable anionic compounds include polymeric acids such as polyacrylic acids, polysulfonic acids, etc.

As previously stated, it is frequently desirable to treat a filter aid material with both anionic and cationic polyelectrolytes in order to enhance the normal surface charge in accordance with the present invention. Thus, an electronegatively charged filter aid material, such as cellulose fibers, can be treated with a suitable chemical compound in order to produce a positive surface charge, and then with another chemical compound in order to again reverse the charge to the normal surface charge. However, this reversed charge is often stronger, and therefore capable of producing clumping characteristics that are superior to those produced when untreated material is employed.

The application of chemical compounds to the filter aids in order to produce a reverse surface charge is normally carried out in aqueous suspension. In carrying out the preferred method, the filter aid material is simply suspended in water, and an adequate amount of chemical compound is added to produce the desired reverse surface charge. With high molecular weight polyelectrolytes (i.e., molecular weights in excess of 100,000), the point at which adequate polyelectrolyte has been added can be determined by observing the filter aid material as the polyelectrolyte is added. Initially, clumping will be produced as the surface charge of a portion of the particles is reversed, and this clumping will then disappear when a reversal of substantially all of the surface charge is observed. However, with lower molecular weight polyelectrolytes, and even with some combinations of high molecular weight polyelectrolytes and filter aid material, no noticeable clumping is produced when the polyelectrolyte is added. In those instances, an adequate amount of polyelectrolyte must be determined from the results obtained when the treated particles are mixed with particles having an opposite surface charge. In general, at least about 5% of the chemical compound, based upon the weight of the dry filter aid particles, is required. However, such larger amounts can be employed, as there is no detriment realized from the use of an excess amount of the surface charge reversal-producing compound. Of course, the amount of compound required in a particular case depends upon many factors, including the nature of the particles being treated and the number of positive or negative sites that are available on the chemical compound being added.

As will be apparent from the foregoing, one method of carrying out the present invention when high molecular weight polyelectrolytes are employed is simply to add a polyelectrolyte which produces a reverse surface charge to an aqueous suspension of filter aid particles. This compound is added in an amount sufficient to produce the desired clumping effect, indicating that the surface charge of a portion of the filter aid particles in suspension has been reversed, and that these particles have clumped with the remaining, untreated particles.

More desirably, however, the particles are first treated in aqueous suspension to produce a complete reversal of surface charge, and the suspension is then dewatered through well known techniques such as decanting, filtration, or a combination thereof. These particles are then combined in aqueous suspension with particles having the normal surface charge. Ordinarily, this combination is performed in about a 50—50 proportion, although this proportion may be adjusted in order to produce the desired amount of clumping. In general, clumping is produced in aqueous suspensions containing anywhere from 5 to 95% of particles having the reversed surface charge.

In the most preferred embodiment of the invention, particles having a negative surface charge in aqueous suspension are treated with a cationic polyelectrolyte to produce a positive surface charge. The treated particles are dewatered and mixed in aqueous suspension with particles having an enhanced negative surface charge. This enhanced negative charge is produced by treating the particles in aqueous suspension with a cationic polyelectrolyte, dewatering the suspension, resuspending the particles in water, and treating them with an anionic polyelectrolyte. The suspension is again dewatered, and the treated particles are mixed in aqueous suspension with particles that have been treated with a cationic polyelectrolyte. It has been found that this method produces a high degree of clumping and a stable floc of filter aid material. Again, the clumping is performed in aqueous suspension, preferably with about a 50—50 mixture of positively and negatively charged polyelectrolytes, although the ratio may be varied anywhere from 5 to 95% positively charged filter aid particles.

After clumping, the mixture may be dewatered and dried, and then resuspended in water when it is desired to precoat a filter to form a filter bed.

The following examples are intended to illustrate the present invention, and should not be construed as limitative, the scope of the invention being determined by the appended claims:

EXAMPLE I 36 g of cellulose fibers having an average length of 96 microns and an average diameter of 17 microns were suspended in 1000 ml of water in a 1.0 liter beaker equipped with a magnetic stirrer. The stirrer was turned on to maintain the cellulose in suspension, and a watersoluble polyethylene polyamine was added slowly. The polyelectrolyte was added until a maximum amount of clumping was observed, which required about 8% polyelectrolyte, based on the dry weight of the cellulose fibers.

The slurry prepared as above was dewatered by filtration with a Buchner funnel. This material could be resuspended in water and precoated onto a filter, such as a tubular, nylon-wound filter element, to produce good filtration characteristics together with a lower pressure drop than would be produced with untreated cellulose fibers.

EXAMPLE II

A suspension of 36 g of anion exchange resin particles was suspended in 1000 ml of water, as in Example I. The particles were in the size range of 60–400 mesh, and were of the sytrenedivinylbenzene copolymer type having quaternary ammonium active groups. The polymer was about 8% cross-linked. A solution of polyacrylic acid having a concentration of 25% by weight and an average molecular weight of about 50,000–150,000 was added slowly to the suspension until maximum clumping was observed, as in Example I. About 10% polyacrylic acid, based upon the weight of the dry anion exchange resin, was required.

The slurry was dewatered with a Buchner funnel and dried. This material could be resuspended in water and precoated onto a filter, such as a tubular, nylon-wound filter element, to produce good filtration characteristics, together with a lower pressure drop than would be produced with untreated anion exchange resin.

EXAMPLE III 150 gallons of water were placed in a 250-gallon tank equipped with a mechanical stirrer. 30 Pounds of cellulose fibers of the type employed in Example I were added, and the cellulose was suspended using the stirrer. 4 Pounds of a commercially available polyamide cationic polyelectrolyte, having a molecular weight in the range of 20,000 to 100,000, were added with continual stirring. This polyamide is commercially available under the trade name "Betz 1175," sold by the Betz Company, Trevose, Pennsylvania. The suspension was then stirred for one hour to thoroughly mix the polyelectrolyte. The cellulose was then dewatered with a Buchner funnel.

Half of the treated cellulose was separated and transferred to a 500-gallon tank equipped with a mechanical stirrer and containing 150 gallons of water. The stirrer was started to resuspend the cellulose, and 8 pounds of an aqueous solution of polyacrylic acid having a concentration of 25% by weight, and having an average molecular weight in the range of 50,000–150,000 was added. This polyacrylic acid solution is commercially available under the trade name "Acrysol A-3" from Rohm & Haas Co., Philadelphia, Pennsylvania. The stirrer was run for 30 minutes to thoroughly coat the treated cellulose fibers to produce a negative surface charge. The suspension was dewatered using a Buchner funnel, and was reslurried in 300 gallons of water. The portion of the cellulose that was treated only with the polyamide was added, and mixed for ten minutes, and the mixture was then dewatered.

The foregoing mixture was suspended in water and coated on a nylon-wound tubular filter element. The material produced excellent filtration characteristics with a minimum of pressure drop.

EXAMPLE IV

A tubular, wound nylon filter element was precoated with a mixture of 75% cation exchange resin and 25% anion exchange resin in the size range of about 60 to 400 mesh, as described in U.S. Pat. No. 3,250,703. This ion exchange resin precoat was applied in an amount of 0.2 pound per square foot of filter element. A second coat of filter aid material prepared in accordance with Example III was then applied to the filter over the precoat of ion exchange resin particles in an amount of 0.06 pound per square foot. The filter cartridge was employed to filter liquid containing both ions and suspended particles containing red iron oxide contaminants. The coating of cellulose fibers over the ion exchange resin effectively removed the bulk of the ion oxide, preventing the cracking of the ion exchange resin that would normally be observed. Very little increase in pressure drop was produced through the use of this overlay.

All of the following examples were conducted in a filter unit containing a single tubular, stainless steel filter element having a layer of 8 mesh stainless steel screen covered by a second layer of 50×250 mesh stainless steel screen, and having a surface area of 0.2 ft$^2$. The filter element was precoated with the precoat being employed by recirculating a slurry of the material through the element until a clear recycle stream was produced, indicating that all of the precoat was deposited on the filter. With the amount of material employed, this procedure produced a uniform precoat having a depth of about ¼ inch. An aqueous suspension containing 500 parts per billion iron as $Fe_2O_3$ (hereinafter referred to as the "standard iron oxide suspension") was passed through the precoated filter element at a temperature of 50°±2° C., and at a constant flow rate of 0.8 gal/min. A portion of the effluent stream was diverted, iron oxide was collected on a 0.45 micron Millipore filter, and was analyzed for iron using the o-phenanthroline method. Pressure drop across the filter was measured with a mercury manometer attached to the influent and effluent lines.

EXAMPLE V

Diatomaceous earth was treated with the same polyamide cationic organic polyelectrolyte described in Example III. To treat the diatomaceous earth, 500 ml. of water was placed in a one-liter beaker equipped with a magnetic stirrer. 9.1 Grams of diatomaceous earth was added, and put into suspension using the stirrer. While the stirring was continued, 3 ml. of the polyelectrolyte was added. Stirring was continued for one hour to ensure complete mixing.

The treated diatomaceous earth was dewatered with a Buchner funnel, and was mixed with 9.1 grams of untreated diatomaceous earth. The mixture was slurried in 6 gallons of demineralized water and precoated onto the filter element. The standard iron oxide suspension was delivered through the precoated filter as described above. The following data were obtained:

| Elapsed Time (Hrs.) | Pressure Drop (psi) |
| --- | --- |
| 1 | 1.332 |
| 2 | 1.458 |
| 3 | 1.692 |
| 4 | 1.962 |
| 5 | 2.106 |

-continued

| Elapsed Time (Hrs.) | Pressure Drop (psi) |
| --- | --- |
| 6 | 2.232 |
| 7 | 2.268 |
| 8 | 2.304 |
| 9 | 2.664 |
| 10 | 2.97 |
| 11 | 3.132 |
| 12 | 3.294 |
| 13 | 3.708 |
| 14 | 4.212 |
| 15 | 4.572 |
| 16 | 4.482 |
| 17 | 4.896 |
| 18 | 5.004 |
| 19 | 5.22 |
| 20 | 5.526 |
| 21 | 5.922 |
| 22 | 7.344 |
| 23 | 7.65 |
| 24 | 8.55 |
| 25 | 8.766 |
| 26 | 8.94 |
| 27 | 9.306 |
| 28 | 10.134 |

At the end of the run, the effluent $Fe_2O_3$ collected on the Millipore filter was analyzed, and the average effluent iron concentration was calculated by dividing by the total volume of water which passed through the Millipore filter. Average effluent iron oxide was 2.7 ppb as Fe. The results are plotted in FIG. 1.

EXAMPLE VI 18.2 Grams of diatomaceous earth was suspended in 500 ml. water and treated with 6 ml. of the cationic polyelectrolyte employed in Example III, and using the same procedure as in Example V. The treated material was dewatered using a Buchner funnel, and one-half of the diatomaceous earth (9.1 grams, dry basis) was resuspended in 500 ml. of demineralized water in the one-liter beaker, and 2.7 g. polyacrylic acid (an anionic polyelectrolyte) was added with stirring. Stirring was continued for one hour to ensure complete mixing. The treated product was dewatered using a Buchner funnel, and was mixed with the other half of the diatomaceous earth, which had been treated only with the cationic polyelectrolyte.

The mixture was slurried in 6 gallons demineralized water, and the suspension was precoated onto the filter element. The standard iron oxide suspension was fed through the precoated element, and the following results were obtained:

| Elapsed Time (Hrs.) | Pressure Drop (psi) |
| --- | --- |
| 1 1/6 | .36 |
| 2 | .36 |
| 3 | .414 |
| 4 | .45 |
| 5 | .63 |
| 6 | .684 |
| 7 | .738 |
| 8 | 1.818 |
| 9 | 2.34 |
| 10 | 2.934 |
| 11 | 3.096 |
| 12 | 2.88 |
| 13 | 4.14 |
| 14 | 4.608 |
| 15 | 4.86 |
| 16 | 5.112 |

-continued

| Elapsed Time (Hrs.) | Pressure Drop (psi) |
| --- | --- |
| 17 | 4.32 |
| 19 | 4.572 |
| 20 | 5.328 |
| 21 | 5.67 |

Average effluent iron was less than 1 ppb as Fe. The results are plotted in FIG. 1.

EXAMPLE VII

In this example, diatomaceous earth was treated entirely with a cationic organic polyelectrolyte, in order to duplicate a superior filter of the prior art. Such a filter is described in U.S. Pat. No. 3,352,424, and is said to perform significantly better than untreated regenerated cellulose because the overall positive surface charge produces an "electrical trap" for particles in suspension.

18.2 grams of diatomaceous earth were suspended in 500 ml. of water and 6 ml. of the same polyelectrolyte used in Example V was added. Stirring was continued for one hour to ensure complete mixing, and the treated diatomaceous earth was then dewatered using a Buchner funnel.

The treated diatomaceous earth was slurried in 6 gallons of demineralized water, and the suspension was precoated onto the filter element. The standard iron oxide suspension was then delivered through the filter as described above. The following results were obtained:

| Elapsed Time (Hrs.) | Pressure Drop (psi) |
| --- | --- |
| 1 | 1.53 |
| 2 | 1.71 |
| 3 | 1.89 |
| 4 | 2.8 |
| 5 | 2.59 |
| 6 | 2.7 |
| 7 | 2.83 |
| 8 | 3.2 |
| 9 | 3.42 |
| 10 | 3.5 |
| 11 | 3.7 |
| 12 | 3.9 |
| 13 | 4.5 |
| 14 | 5.02 |
| 15 | 5.2 |
| 16 | 5.92 |
| 17 | 6.3 |
| 18 | 7.3 |
| 19 1/6 | 7.4 |
| 20 | 8.37 |
| 21 | 8.1 |
| 22 | 8.9 |
| 23 | 9.2 |
| 24 | 9.2 |
| 25 | 9.5 |
| 26 | 9.7 |
| 27 | 9.8 |
| 28 | 9.9 |
| 29 | 13.5 |
| 30 | 13.8 |
| 31 | 13.8 |
| 32 | 14.2 |
| 33 | 14.4 |
| 34 | 15.5 |

Average effluent iron concentration was 3.6 ppb as Fe. The above data are plotted in FIG. 1.

As shown in FIG. 1, the filter bed of the present invention produces low pressure drop and low effluent iron oxide concentration, and is significantly superior to the prior art. Significantly longer runs can therefore be predicted, compared to prior art filters.

EXAMPLE VIII 18.2 Grams of regenerated cellulose, which is commercially available under the trade name of Solka-Floc, was added to a one-liter beaker equipped with a magnetic stirrer and containing 500 ml. of demineralized water. The regenerated cellulose was suspended using the stirrer, and, while stirring was continued, 3 grams of the polyelectrolyte described in Example III was added. Stirring was continued for one hour to ensure complete mixing, and the treated regenerated cellulose was dewatered using a Buchner funnel.

One half of the treated regenerated cellulose (9.1 grams, dry basis) was resuspended in 500 ml. of demineralized water in the one-liter beaker, and 2.7 g. of polyacrylic acid (an anionic polyelectrolyte) was added with stirring. Stirring was continued for one hour to ensure complete mixing. The treated product was dewatered using a Buchner funnel, and was mixed with the other half of the regenerated cellulose, which had been treated only with the cationic polyelectrolyte.

The mixture was slurried in 6 gallons demineralized water and the suspension was precoated onto the filter element. The standard iron oxide suspension was fed through the precoated filter, and the following results were obtained:

| Elapsed Time (Hrs.) | Pressure Drop (psi) |
| --- | --- |
| 1 | 0.846 |
| 2 | 0.738 |
| 3 | 0.810 |
| 4 | 0.83 |
| 5 | 0.936 |
| 6 | 1.026 |
| 7 | 1.17 |
| 8 | 1.42 |
| 9 | 0.954 |
| 10 | 1.08 |
| 11 | 1.242 |
| 12 | 1.296 |
| 14 | 2.268 |
| 15 | 3.092 |
| 16 | 3.294 |
| 17 | 3.888 |
| 18 | 4.212 |
| 19 | 4.374 |
| 20 | 5.094 |
| 21 | 5.67 |
| 23 | 5.958 |
| 24 | 6.516 |
| 25 | 6.732 |
| 26 | 7.074 |
| 27 | 8.298 |
| 28 | 9.09 |

Effluent iron oxide averaged 0.2 ppb as Fe. The results are plotted in FIG. 2.

EXAMPLE IX 9.1 Grams of the same type of regenerated cellulose used in Example VIII was suspended in 500 ml. of demineralized water as before. 3 grams of 1-carboxymethylpyridinium chloride was added, and stirring was continued for one hour. The regenerated cellulose was dewatered, mixed with 9.1 g. of untreated regenerated cellulose, resuspended, and precoated onto the filter element as before. The standard iron oxide suspension was passed through the precoated filter, and the following results were obtained:

| Elapsed Time (Hrs.) | Pressure Drop (psi) |
| --- | --- |
| 1 | 0.774 |
| 2 | 0.918 |
| 3 | 0.954 |
| 4 | 1.08 |
| 5 | 1.08 |
| 6 | 1.17 |
| 7 | 1.314 |
| 8 | 1.188 |
| 9 | 1.782 |
| 10 | 1.872 |
| 11 | 2.592 |
| 12 | 2.664 |
| 13 | 3.366 |
| 14 | 3.816 |
| 15 | 4.104 |
| 16 | 4.608 |
| 17 | 4.446 |
| 18 | 5.04 |

Effluent iron oxide averaged less than 0.1 ppb as Fe. The results are plotted in FIG. 2.

EXAMPLE X

For comparison purposes, 18.2 grams of the same regenerated cellulose used in Example VIII was slurried in 6 gallons of demineralized water, and precoated onto the filter element without pretreatment. The standard iron oxide suspension was delivered to the precoated filter as in Example V. Results are given below:

| Elapsed Time (Hrs.) | Pressure Drop (psi) |
| --- | --- |
| 1 | 0.81 |
| 2 | 1.17 |
| 3 | 1.386 |
| 4 | 1.62 |
| 5 | 1.782 |
| 6 | 1.962 |
| 7 | 2.106 |
| 8 | 2.448 |
| 9 | 2.754 |
| 10 | 3.366 |
| 11 | 4.41 |
| 12 | 4.968 |
| 13 | 5.22 |
| 14 | 5.76 |
| 15 | 6.246 |
| 16 | 6.606 |
| 17 | 7.128 |
| 18 | 7.668 |
| 19 | 8.424 |
| 20 | 9.54 |
| 21 | 10.08 |
| 22.5 | 10.89 |
| 23.5 | 12.96 |
| 24.5 | 11.79 |

Average effluent iron was 3.7 ppb as Fe. The results are plotted in FIG. 2.

As demonstrated by Examples VIII through X, and as shown in FIG. 2, the present invention produces significantly improved filtration characteristics when compared to untreated regenerated cellulose, a common filter of the prior art. The polymeric polyelectrolyte (Example VIII) produced outstanding results, and the non-polymeric cationic compound (Example IX) also produced significantly lower pressure drops and Fe$_2$O$_3$ removal as compared to the untreated material (Example X).

EXAMPLE XI 17.2 g. of the same regenerated cellulose used in Examples VIII through X was suspended in 500 ml. demineralized water, and 3.0 g. of the cationic polyelectrolyte described in Example V was added. Stirring was continued for one hour, and the slurry was dewatered using a Buchner funnel.

The treated regenerated cellulose was mixed with 0.9 grams untreated regenerated cellulose, suspended, and precoated onto the filter element. The standard iron oxide suspension was passed through the precoated filter, and the following results were obtained:

| Elapsed Time (Hrs.) | Pressure Drop (psi) |
|---|---|
| 1 | 0.792 |
| 2 | 0.774 |
| 3 | 0.828 |
| 4 | 0.846 |
| 5 | 0.990 |
| 6 | 1.08 |
| 7 | 1.08 |
| 8 | — |
| 9 | 1.494 |
| 10 | 1.62 |
| 11 | 1.71 |
| 13 | 2.142 |
| 14 | 2.43 |
| 15 | 2.178 |
| 16 | 2.736 |
| 17 | 3.114 |
| 18 | 3.456 |
| 19 | 3.744 |
| 20 | 3.870 |
| 21 | 4.518 |
| 22 | 5.022 |
| 23 | 5.490 |
| 24 | 5.652 |
| 25 | 5.920 |

Effluent iron oxide averaged 0.2 ppb. The results are plotted in FIG. 3.

0.9 g. of the same regenerated cellulose used in Examples VIII through X was suspended in 300 ml. demineralized water and 0.15 g. of the cationic polyelectrolyte described in Example III was added. Stirring was continued for one hour, and the slurry was dewatered using a Buchner funnel.

The treated regenerated cellulose was mixed with 17.2 g. untreated regenerated cellulose, suspended, and precoated onto the filter element. The standard iron oxide suspension was passed through the precoated filter, and the following results were obtained:

| Elapsed Time (Hrs.) | Pressure Drop (psi) |
|---|---|
| 1 | 0.648 |
| 2 | 0.72 |
| 3 | 0.774 |
| 4 | 0.828 |
| 5 | 0.90 |
| 6 | 1.026 |
| 7 | 1.116 |
| 8 | 1.26 |
| 9 | 1.53 |
| 10 | 1.656 |
| 11 | 1.854 |
| 12 | 2.034 |
| 13 | 2.196 |
| 14 | 2.52 |
| 15.25 | 2.826 |
| 16 | 3.006 |
| 17 | 3.276 |
| 18 | 3.474 |
| 19 | 3.744 |
| 20 | 3.996 |
| 21 | 4.14 |
| 22 | 4.32 |
| 23 | 4.626 |
| 24 | 5.166 |
| 25 | 5.85 |

Effluent iron oxide averaged 3.0 ppb. The results are plotted in FIG. 3.

Examples XI and XII demonstrate the effectiveness of the present invention in reducing pressure drop across the filter bed as compared to the untreated regenerated cellulose of the prior art (Example X), even when the treated or untreated regenerated cellulose greatly predominates.

Obviously, many modifications and variations of the invention as hereinbefore set forth will occur to those skilled in the art, and it is intended to cover in the appended claims all such modifications and variations as fall within the true spirit and scope of the invention.

I claim:

1. A method for removing impurities from a liquid comprising: passing said liquid through a filter bed comprising a mixture of oppositely charged particles of filter aid material, said mixture producing a clumping phenomenon, said particles normally all having the same surface charge in aqueous suspension, wherein 5 to 95% of said material has been treated with an electrolyte-type compound that produces a surface charge opposite to said normal surface charge by bonding to the surface of said filter aid material.

2. The method as defined in claim 1 wherein said particles normally have a negative surface charge.

3. The method as defined in claim 2 wherein said particles comprise cellulose fibers.

4. The method as defined in claim 2 wherein said particles comprise cation exchange resin particles in the size range of 60 to 400 mesh.

5. The method as defined in claim 1 wherein said electrolyte-type compound comprises a polyelectrolyte.

6. The method as defined in claim 1 further comprising the step of passing said liquid through a mixture of anion and cation exchange resin particles after passing said liquid through said filter aid material, said resin particles being in the size range of about 60 to 400 mesh, said cation exchange resin particles comprising about 5 to 95% by weight of the particles in said mixture.

7. The method as defined in claim 6 wherein said filter aid particles comprise cellulose fibers.

8. The method as defined in claim 7 wherein said electrolyte-type compound comprises a polyelectrolyte.

9. A method for removing impurities from a liquid comprising passing said liquid through a bed of oppositely charged particles of filter aid material, said mixture producing a clumping phenomenon said particles normally all having a negative surface charge in aqueous suspension, wherein 5 to 95% of said material has been treated in aqueous suspension with a cationic polyelectrolyte to produce a positive surface charge by bonding to the surface of said filter aid material, and wherein the remainder of said material has been treated in aqueous suspension with a cationic polyelectrolyte and then with an anionic polyelectrolyte to produce a negative surface charge by bonding to said filter aid material previously treated with said cationic polyelectrolyte.

10. The method as defined in claim 9 wherein said particles comprise cellulose fibers.

11. The method as defined in claim 9 wherein said particles comprise cation exchange resin particles.

12. The method as defined in claim 9 further comprising the step of passing said liquid through a mixture of anion and cation exchange resin particles after passing through said filter aid material, said resin particles being in the size range of about 60 to 400 mesh, said cation exchange resin particles comprising about 5 to 95% by weight of the particles in said mixture.

13. The method as defined in claim 12 wherein said particles comprise cellulose fibers.

14. An improved filter bed comprising a mixture of oppositely charged particles of filter aid material, said mixture producing a clumping phenomenon, said particles normally all having the same surface charge in aqueous suspension, wherein 5 to 95% of said material has been treated with an electrolyte-type compound that produces a surface charge opposite to said normal surface charge by bonding to said surface of said filter aid material.

15. The improved filter bed as defined in claim 14 wherein said particles normally have a negative surface charge.

16. The improved filter bed as defined in claim 15 wherein said particles comprise cellulose fibers.

17. The improved filter bed as defined in claim 15 wherein said particles comprise cation exchange resin particles.

18. The improved filter bed as defined in claim 14 wherein said an electrolyte-type compound comprises a polyelectrolyte.

19. The improved filter bed as defined in claim 14 wherein said filter bed further comprises a layer of ion exchange resin particles beneath said filter aid material, said resin particles comprising a mixture of anion and cation exchange resin particles in the size range of about 60 to 400 mesh, said cation exchange resin particles comprising about 5 to 95% by weight of the particles in said mixture.

20. The improved filter bed as defined in claim 19 wherein said filter aid particles comprise cellulose fibers.

21. An improved filter bed comprising: a mixture of oppositely charged particles of filter aid material, said mixture producing a clumping phenomenon, said particles normally all having a negative surface charge in aqueous suspension, wherein 5 to 95% of said material has been treated in aqueous suspension with a cationic polyelectrolyte to produce a positive surface charge by bonding to the surface of said filter aid material, and wherein a second portion of said particles has been treated in aqueous suspension with a cationic polyelectrolyte and then with an anionic polyelectrolyte to produce a negative surface charge by bonding to said filter aid material previously treated with said cationic polyelectrolyte.

22. The improved filter bed as defined in claim 21 wherein said particles comprise cellulose fibers.

23. The improved filter bed as defined in claim 21 wherein said filter bed further comprises a layer of ion exchange resin particles beneath said filter aid material, said resin particles comprising a mixture of anion and cation exchange resin particles in the size range of about 60 to 400 mesh, said cation exchange resin particles comprising about 5 to 95% by weight of the particles in said mixture.

24. The improved filter bed as defined in claim 23 wherein said filter aid particles comprise cellulose fibers.

* * * * *

UNITED STATES PATENT AND TRADEMARK OFFICE
CERTIFICATE OF CORRECTION

PATENT NO. : 4,177,142
DATED : December 4, 1979
INVENTOR(S) : Christopher J. Halbfoster It is certified that error appears in the above-identified patent and that said Letters Patent are hereby corrected as shown below:

| | |
|---|---|
| Col. 3, line 5 | "crosslinking" should read --cross-linking--. |
| Col. 3, lines 16-22 | In the chemical formula for the cationic polyamine repeating unit, the methylene group "$CH_3$" should read --$CH_2$--. |
| Col. 3, line 26 | "when" should read --where--. |
| Col. 3, line 27 | "solution" should read --suspension--. |
| Col. 4, line 2 | "such" should read --much--. |
| Col. 5, line 7 | after "funnel" and before the period, insert --and dried--. |

Signed and Sealed this

Fourth Day of November 1980

[SEAL]

Attest:

SIDNEY A. DIAMOND

Attesting Officer

Commissioner of Patents and Trademarks